(12) United States Patent
Howe

(10) Patent No.: US 10,160,364 B2
(45) Date of Patent: Dec. 25, 2018

(54) TAILGATE TABLE

(71) Applicant: Robert Howe, Waverly, IA (US)

(72) Inventor: Robert Howe, Waverly, IA (US)

(*) Notice: Subject to any disclaimer, the term of this patent is extended or adjusted under 35 U.S.C. 154(b) by 0 days.

(21) Appl. No.: 15/635,908

(22) Filed: Jun. 28, 2017

(65) Prior Publication Data

US 2018/0072208 A1 Mar. 15, 2018

Related U.S. Application Data

(60) Provisional application No. 62/393,818, filed on Sep. 13, 2016.

(51) Int. Cl.
| | |
|---|---|
| *B60N 3/00* | (2006.01) |
| *A47B 5/06* | (2006.01) |
| *A47B 9/00* | (2006.01) |
| *A47B 5/04* | (2006.01) |
| *A47B 13/08* | (2006.01) |
| *A47B 37/04* | (2006.01) |
| *A47B 5/02* | (2006.01) |
| *A47B 3/08* | (2006.01) |
| *A47B 31/06* | (2006.01) |
| *A47B 9/08* | (2006.01) |

(52) U.S. Cl.
CPC ............... *B60N 3/001* (2013.01); *A47B 3/08* (2013.01); *A47B 5/02* (2013.01); *A47B 5/04* (2013.01); *A47B 5/06* (2013.01); *A47B 9/00* (2013.01); *A47B 13/083* (2013.01); *A47B 31/06* (2013.01); *A47B 37/04* (2013.01); *A47B 9/08* (2013.01)

(58) Field of Classification Search
CPC .. B60N 3/001; A47B 5/02; A47B 5/04; A47B 5/06; A47B 9/00; A47B 13/083; A47B 37/04
See application file for complete search history.

(56) References Cited

U.S. PATENT DOCUMENTS

| | | | | |
|---|---|---|---|---|
| 1,487,569 A | * | 3/1924 | Huddle | B60N 3/001 190/12 R |
| 2,904,378 A | * | 9/1959 | MacIver | A47B 31/06 108/152 |
| 3,062,544 A | * | 11/1962 | Viets | A47B 5/06 108/166 |
| 3,338,620 A | * | 8/1967 | Cauvin | B60N 3/001 108/44 |
| 4,452,151 A | * | 6/1984 | Jarrard | B60R 5/04 108/42 |
| 4,856,840 A | * | 8/1989 | Hanley | B60P 1/003 29/401.1 |
| 4,887,526 A | * | 12/1989 | Blatt | B60N 3/001 108/44 |
| 4,962,709 A | * | 10/1990 | Huber | B60N 3/001 108/27 |
| 5,090,335 A | * | 2/1992 | Russell | B60P 1/433 108/44 |

(Continued)

*Primary Examiner* — Hanh V Tran
(74) *Attorney, Agent, or Firm* — Global Intellectual Property Agency, LLC; Daniel Boudwin

(57) ABSTRACT

The tailgate table includes a panel having a first pair of legs pivotally affixed to a lower side at a first end of the panel. At least one fastener is disposed on a second end of the panel wherein the fastener is can removably secure the second end to a tailgate of a vehicle. The second end is beveled to engage with the tailgate.

15 Claims, 3 Drawing Sheets

(56) References Cited

U.S. PATENT DOCUMENTS

| | | | | |
|---|---|---|---|---|
| 5,479,866 A * | 1/1996 | Rae | A47B 23/001 108/25 |
| 5,511,493 A * | 4/1996 | Kanehl, Jr. | B60N 3/001 108/44 |
| 5,649,731 A | 7/1997 | Tognetti | |
| 5,730,066 A * | 3/1998 | Auten | B60N 3/001 108/44 |
| 5,992,331 A * | 11/1999 | Inoue | A47B 3/0912 108/132 |
| 5,996,507 A * | 12/1999 | Joseph | B60N 3/001 108/125 |
| 6,039,416 A * | 3/2000 | Lambert | A47B 5/06 108/48 |
| 6,193,294 B1 * | 2/2001 | Disner | B62D 33/0273 108/44 |
| 6,641,190 B2 * | 11/2003 | Kirchhoff | B60P 3/14 296/26.08 |
| 6,739,269 B1 * | 5/2004 | Benton | A47B 31/06 108/152 |
| 7,267,244 B1 * | 9/2007 | Dalhamer | A47G 23/06 220/574 |
| 7,309,202 B1 | 12/2007 | Anderson | |
| 7,354,090 B1 * | 4/2008 | Pomorski | B60N 2/005 296/26.11 |
| 7,398,737 B1 * | 7/2008 | Martellaro | B60N 3/001 108/143 |
| D735,492 S * | 8/2015 | Coffman | D6/555 |
| 9,629,450 B1 * | 4/2017 | Howard | A47K 17/02 |
| 9,879,435 B2 * | 1/2018 | Kruger | E04F 19/08 |
| 9,883,738 B2 * | 2/2018 | Jaramillo | A47B 13/083 |
| 2005/0156445 A1 * | 7/2005 | Mains | B60N 3/001 296/37.16 |
| 2007/0039523 A1 * | 2/2007 | Helzer | A47B 13/083 108/27 |
| 2007/0056482 A1 * | 3/2007 | Robinson | A47B 3/06 108/25 |
| 2009/0212593 A1 * | 8/2009 | Larson | B60P 3/32 296/158 |
| 2009/0314187 A1 * | 12/2009 | Miller | B25H 1/04 108/25 |
| 2011/0247530 A1 * | 10/2011 | Coffman | A47B 3/0911 108/116 |
| 2012/0313395 A1 * | 12/2012 | Newberg | B60R 5/04 296/65.03 |
| 2014/0102337 A1 * | 4/2014 | Ralph | A47B 37/04 108/25 |
| 2015/0068433 A1 * | 3/2015 | Nardi | A47B 13/16 108/25 |
| 2015/0320196 A1 * | 11/2015 | Polizzi | A47B 5/02 320/101 |
| 2016/0123034 A1 * | 5/2016 | Leathers | E04H 15/02 135/161 |

* cited by examiner

TAILGATE TABLE

CROSS REFERENCE TO RELATED APPLICATIONS

This application claims the benefit of U.S. Provisional Application No. 62/393,818 filed on Sep. 13, 2016. The above identified patent application is herein incorporated by reference in its entirety to provide continuity of disclosure.

BACKGROUND OF THE INVENTION

The present invention relates to tailgate tables. Specifically, it relates to tailgate tables having a pair of legs configured to removably secure to the tailgate of a vehicle.

Many people enjoy tailgating at sporting events. However, setting up a tailgating party can be time consuming and difficult. Frequently, one must climb into the back of a vehicle to retrieve the supplies for the tailgate party which can be dangerous. Additionally, removing and setting up a heavy table can be frustrating. Transporting a large table can also be difficult when already carrying large quantities of food and drink for the tailgating party. Therefore, a table that is mountable to a truck bed and tailgate that can be easily set up is provided.

In light of the devices disclosed in the known art, it is submitted that the present invention substantially diverges in design elements from the known art and consequently it is clear that there is a need in the art for an improvement to existing tailgate tables. In this regard, the instant invention substantially fulfills these needs.

SUMMARY OF THE INVENTION

In view of the foregoing disadvantages inherent in the known types of tailgate tables now present in the prior art, the present invention provides a tailgate table wherein the same can be utilized for providing convenience for the user when tailgating, picnicking, fishing, hunting, shopping, and the like.

The present system comprises a panel having a first pair of legs pivotally affixed to a lower side at a first end thereof. A second end of the panel comprises a first fastener disposed thereon, wherein the first fastener is configured to removably secure the second end to a tailgate of a vehicle. The second end is beveled such that the second end engages with the tailgate. In some embodiments, a lip extends upwards from a perimeter of the panel. In another embodiment, netting extends along the perimeter. In other embodiments, the first pair of legs are adjustable in length. In yet another embodiment, at least one second fastener is disposed around an outer surface of the panel. In some embodiments, the second fastener comprises a hook. In another embodiment, a second pair of legs are pivotally affixed to the lower side at the second end. In other embodiments, the second pair of legs are adjustable in length. In yet another embodiment, the panel further comprises at least one aperture disposed on an upper side of the panel, wherein the aperture is configured to receive a support member of a canopy therein. In some embodiments, the aperture is disposed on a corner of the panel. In another embodiment, a first handle is disposed at the first end. In other embodiments, a second handle is disposed on the second end. In yet another embodiment, the first fastener comprises an L-shaped bracket.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
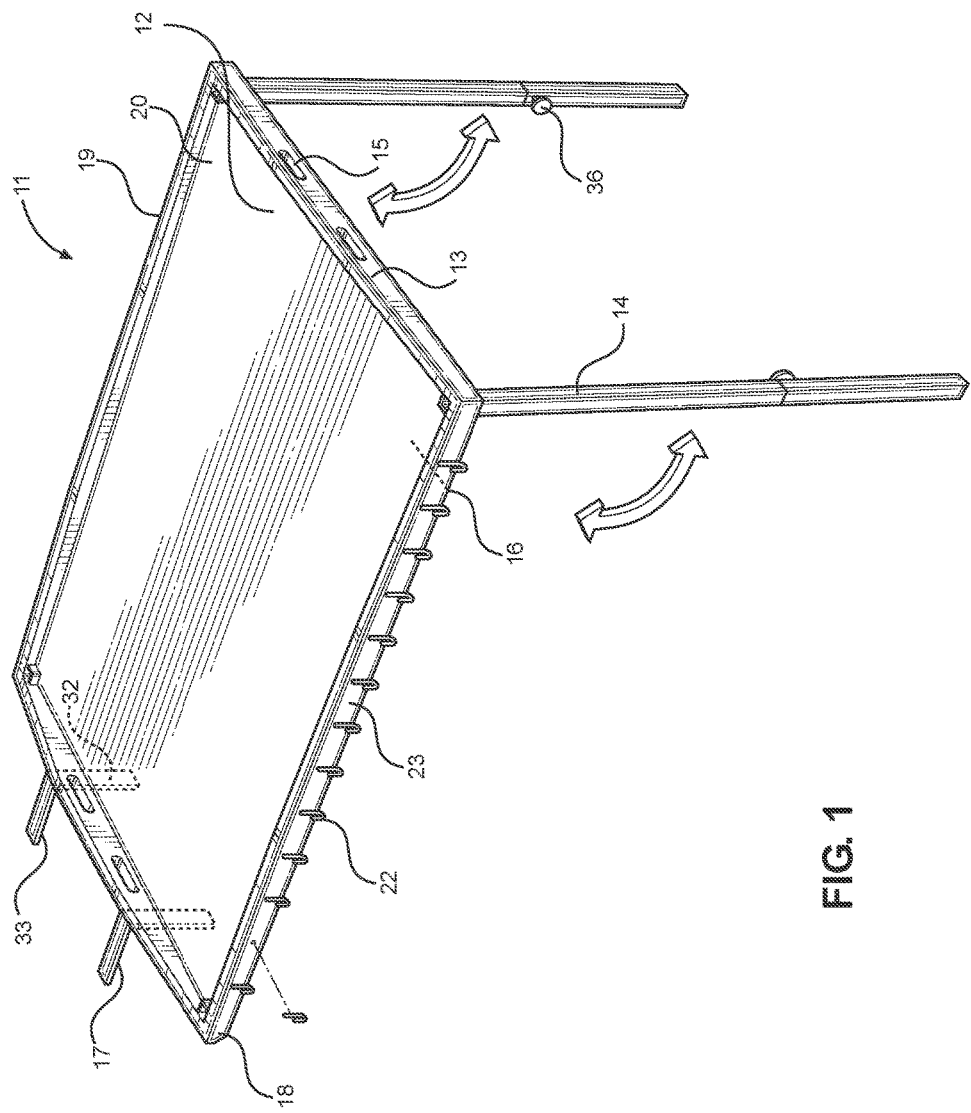
FIG. 1 shows a perspective view of an embodiment of the tailgate table.

Reference is made herein to the attached drawings. Like reference numerals are used throughout the drawings to depict like or similar elements of the tailgate table. The figures are intended for representative purposes only and should not be considered to be limiting in any respect.

Figure 2:
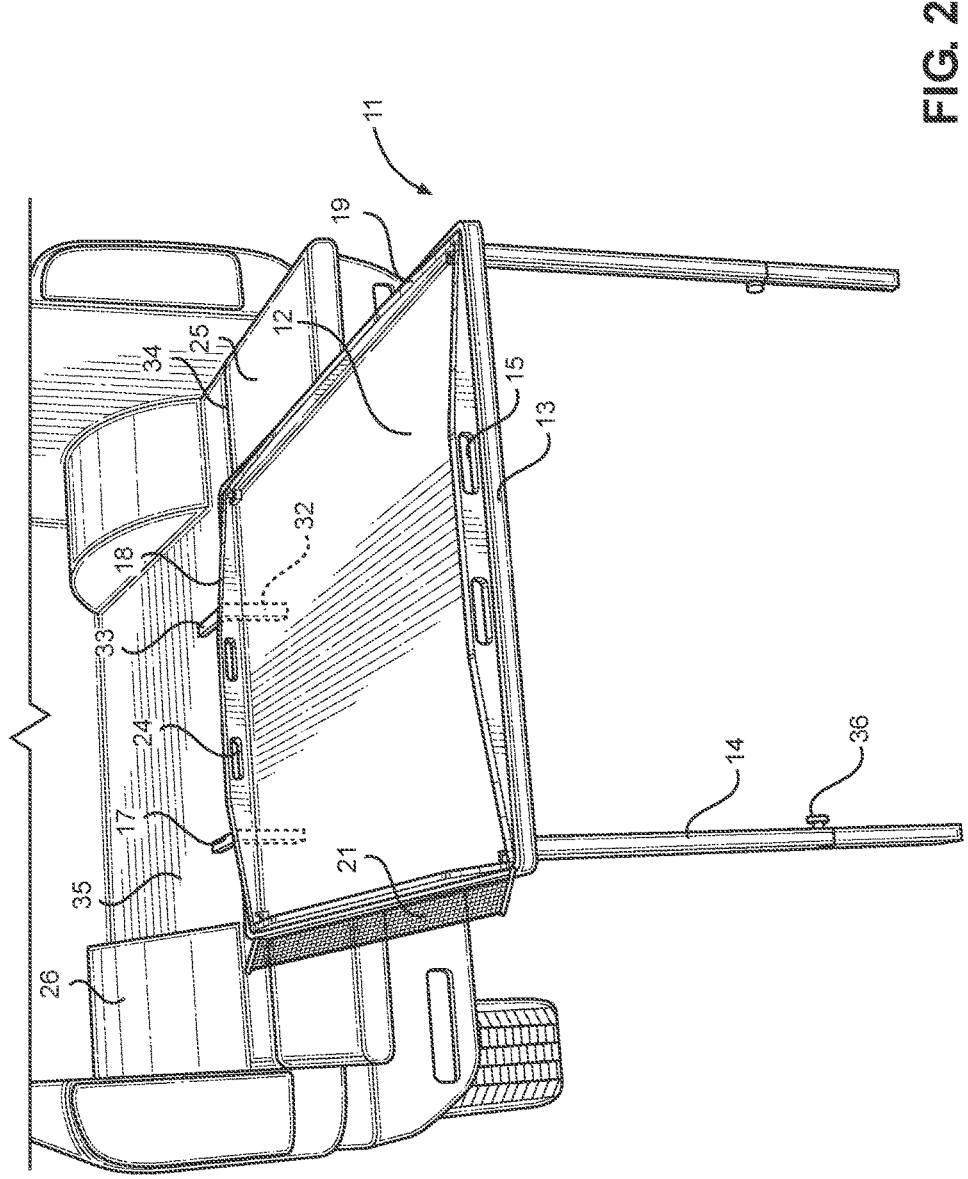
FIG. 2 shows a perspective view of an embodiment of the tailgate table in use.

Referring now to FIG. 1, there is shown a perspective view of an embodiment of the tailgate table. The tailgate table 11 comprises a panel 12 having a first end 13 and a second end 18. In the illustrated embodiment, the panel 12 comprises a rectangular shape, however in alternate embodiments, the panel 12 comprises other shapes, such as square, round, ovoid, or the like. The second end 18 is beveled such that the second end 18 can engage with the surface of a tailgate. In the illustrated embodiment, the bevel comprises a 45-degree angle from a lower side 16 of the panel 12, wherein the bevel is configured to end at the height of the panel 12. This beveling also allows the tailgate table 11 to be raised at the first end 13 thereof. In the illustrated embodiment, the panel 12 further comprises a lip 19 extending perpendicularly from a perimeter 20 of the panel 12. The lip 19 is configured to prevent objects stored on the panel 12 from falling off of the tailgate table 11. In the illustrated embodiment, the lip 19 further comprises a first handle 15 disposed on the first end 13 and a second handle (as seen in FIG. 2, 24) disposed on the second end 18. In the illustrated embodiment, the first and second handles 15, 24 each comprise a pair of oval shaped apertures extending through the lip 19 of the panel 12.

A first pair of legs 14 are pivotally affixed to the lower side 16 of the panel 12 at the first end 13. The first pair of legs 14 are configured to pivot up to the lower side 16 to provide a compact form factor for storage. In the illustrated embodiment, the second end 18 is configured to rest upon a tailgate of a vehicle. In some embodiments, the first pair of legs 14 are adjustable in length, such as via telescopic movement. In the illustrated embodiment, the first pair of legs 14 further comprise a tightening bolt 36. The tightening bolt 36 is configured to secure the first pair of legs 14 in an extended position. In this way, the user can adjust the height of the panel 12 to be at a desired height, such as to match the height of the tailgate. Additionally, the adjustability of the first pair of legs 14 allows the user to provide a level surface in uneven terrain.

A first fastener 17 is disposed on the second end 18 of the panel 12. The first fastener 17 is configured to removably secure the second end 18 to a tailgate of a vehicle. In this way, the second end 18 is stabilized and supported by the tailgate. In the illustrated embodiment, the first fastener 17 comprises an L-shaped bracket, wherein the L-shaped bracket has a first arm 32 that is configured to insert into a gap (as seen in FIG. 2, 34) between the tailgate and the truck bed. A second arm 33 is configured to rest flush on the truck bed to provide additional stability.

In the illustrated embodiment, the lip 19 further comprises at least one second fastener 22 disposed about an outer surface 23 thereof. The second fastener 22 is configured to removably secure to the outer surface 23 such that the tailgate table 11 can be easily stored without additional protrusions from the lip 19. The second fastener 22 is further configured to support an object thereon, such as a flag or banner. In this way, a user can show support for a variety of sporting teams or causes as may be represented on such flags or banners. In some embodiments, the second fastener 22 comprises a hook and loop fastener or a spring loaded clamp, while in the illustrated embodiment, the second fastener 22 comprises a hook.

Referring now to FIG. 2, there is shown a perspective view of an embodiment of the tailgate table in use. In the illustrated embodiment, the tailgate table 11 is removably secured to the tailgate 25 of the vehicle 26. The first arm 32 is inserted into the gap 34 between the tailgate 25 and the truck bed 35. The second arm 33 rests flush against the truck bed 35 to provide additional stability. The bevel of the second end 18 engages with the tailgate 25 to allow the second arm 33 to rest flush against the truck bed 35.

In the illustrated embodiment, the lip 19 further comprises netting 21 extending away from the outer surface 23. In some embodiments, the netting 21 is disposed at a 30-degree angle from the plane of the panel. The netting 21 is removably securable to the lip 19 and is configured to prevent objects that fall off of the tailgate table 11 from hitting the ground. The objects would instead be captured by the netting 21 for easy retrieval. In the illustrated embodiment, the netting 21 is located on one side of the lip 19, however in alternate embodiments, the netting 21 extends along the perimeter 20 to provide increased protection against falling objects.

Figure 3:
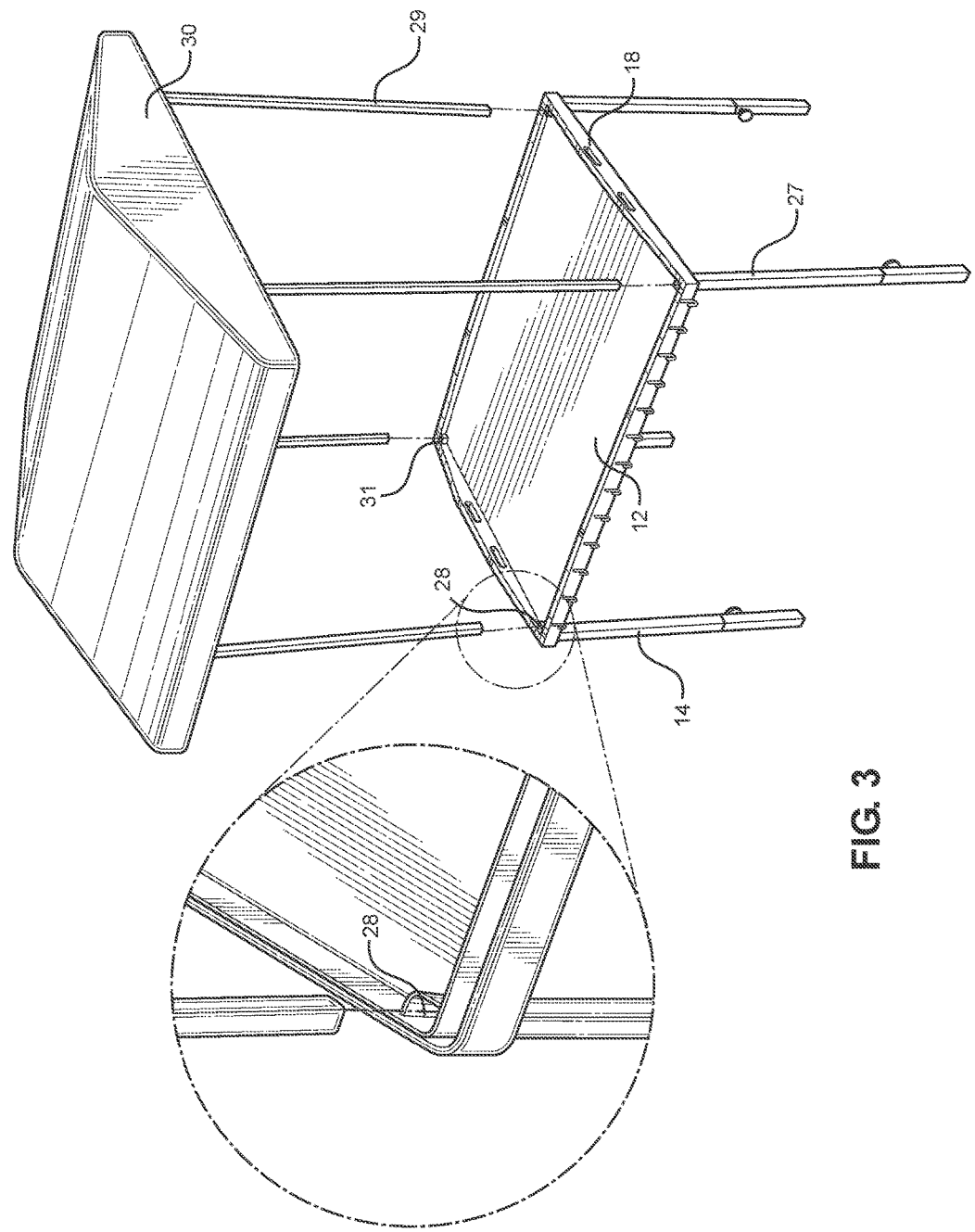
FIG. 3 shows an exploded view of an embodiment of the tailgate table with canopy.

Referring now to FIG. 3, there is shown an exploded view of an embodiment of the tailgate table with canopy. In the illustrated embodiment, the tailgate table further comprises a second pair of legs 27 pivotally affixed to the second end 18. The second pair of legs 27 are configured to pivot towards the lower side 16 to provide a compact form factor for efficient storage. In some embodiments, the second pair of legs 27 are adjustable in length, such as via telescopic movement. In the illustrated embodiment, the second pair of legs 27 further comprise a tightening bolt 36. The tightening bolt 36 is configured to secure the second pair of legs 27 in an extended position. In this way, the panel 12 is free-standing on the first and second pairs of legs 14, 27 to operate as a table away from a tailgate. As each individual leg is adjustable in length, the panel 12 can provide a level surface in uneven terrain.

In the illustrated embodiment, the panel 12 further comprises at least one aperture 28 disposed in at least one corner 31 thereof. The aperture 28 is configured to receive a support member 29 of a canopy 30 therein. The aperture 28 further comprises a base configured to prevent the support member 29 from sliding beyond the panel 12. In this way, the canopy 30 can be removably secured to the panel 12 to provide a user with shade and comfort while tailgating. In the illustrated embodiment, the canopy 30 comprises a pair of angled surfaces meeting at an apex, wherein the canopy 30 is configured to extend beyond the surface of the panel 12 such that users adjacent to the panel 12 are shaded thereby.

Referring to FIGS. 1-3, in one use, a user pivots the first pair of legs 14 downward from the panel 12 and adjusts the height thereof via the tightening bolt 36. The user then removably secures the first arm 32 within the gap 34 to stabilize the tailgate table 11. Should the user wish to display pride in a particular team or group, the user then removably secures a flag or banner to the second fasteners 22. In an alternate embodiment, the user can set up the tailgate table 11 with a canopy 30. The user pivots the second pair of legs 27 downward from the panel 12. The user adjusts the second pair of legs 27 to provide a level surface. The user inserts the support member 29 into the aperture 28 to removably secure the canopy 30 to the tailgate table 11.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A tailgate table, comprising:
a panel having a first pair of legs pivotally affixed to a lower side at a first end;
a netting extending along the perimeter;
wherein the netting is disposed at a 30-degree angle from a plane of the panel;
a second end of the panel having a first fastener disposed thereon configured to removably secure the second end to a tailgate of a vehicle;
wherein the second end is beveled to engage with the tailgate.

2. The tailgate table of claim 1, further comprising a lip extending perpendicularly from a perimeter of the panel.

3. The tailgate table of claim 1, wherein the first pair of legs are adjustable in length.

4. The tailgate table of claim 1, wherein at least one second fastener is disposed around an outer surface of the panel.

5. The tailgate table of claim 4, wherein the second fastener comprises a hook.

6. The tailgate table of claim 1, further comprising a second pair of legs pivotally affixed to the lower side at the second end.

7. The tailgate table of claim 6, wherein the second pair of legs are adjustable in length.

8. The tailgate table of claim 1, wherein the panel further comprises at least one aperture disposed on an upper side of the panel, configured to receive a support member of a canopy therein.

9. The tailgate table of claim 8, wherein the aperture is disposed on a corner of the panel.

10. The tailgate table of claim 1, wherein a first handle is disposed at the first end.

11. The tailgate table of claim 1, wherein a second handle is disposed on the second end.

12. The tailgate table of claim 1, wherein the first fastener comprises an L-shaped bracket having a first arm configured to insert into a gap between the tailgate and a vehicle.

13. The tailgate table of claim 12, wherein a second arm of the first fastener is configured to rest flush against a truck bed.

14. The tailgate table of claim 1, wherein the first pair of legs rest parallel to the panel when stored, and perpendicular to the panel when in use.

15. The tailgate table of claim 6, wherein the second pair of legs rest parallel to the panel with stored, and perpendicular to the panel when in use.

* * * * *